(12) United States Patent
Gaertner et al.

(10) Patent No.: US 6,418,522 B1
(45) Date of Patent: Jul. 9, 2002

(54) TRANSLATION LOOKASIDE BUFFER FOR VIRTUAL MEMORY SYSTEMS

(75) Inventors: Ute Gaertner, Schoenaich (DE); John MacDougall, Hyde Park, NY (US); Erwin Pfeffer, Holzgerlingen; Kerstin Schelm, Stuttgart, both of (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/501,741

(22) Filed: Feb. 11, 2000

(30) Foreign Application Priority Data

Feb. 13, 1999 (EP) ............................................ 99102950

(51) Int. Cl.$^7$ ............................................... G06F 12/10
(52) U.S. Cl. ...................................................... 711/207
(58) Field of Search ................................. 711/207, 206, 711/205

(56) References Cited

U.S. PATENT DOCUMENTS 5,386,530 A    1/1995   Hattori ....................... 711/207
6,272,597 B1 *  8/2001   Fu et al. ................. 711/207 X

* cited by examiner

Primary Examiner—David L. Robertson
(74) Attorney, Agent, or Firm—Scully, Scott, Murphy & Presser; Casey P. August

(57) ABSTRACT

The basic idea comprised of the present invention is to provide a translation lookaside buffer (TLB) arrangement which advantageously uses two buffers, a small first level TLB1 and a larger second level TLB2. The second level TLB feeds address information to the first level TLB when the desired virtual address is not contained in the first level TLB. According to the invention the second level TLB is structured advantageously comprising two n-way set-associative sub-units of which one, a higher level unit covers some higher level address translation levels and the other one, a lower level unit, covers some lower level translation level. According to the present invention, some address information holds some number of middle level virtual address (MLVA) bits, i.e., 8 bits, for example, being able to serve as an index address covering the address range of the higher level sub-unit. Thus, the same information is used as a tag information in the lower-level sub-unit and is used herein as a quick reference in any look-up operation in order to find the absolute address of the concerned virtual address. Further, the commonly used status bits, like; e.g., valid bits, are used in both TLB structures, too.

8 Claims, 6 Drawing Sheets

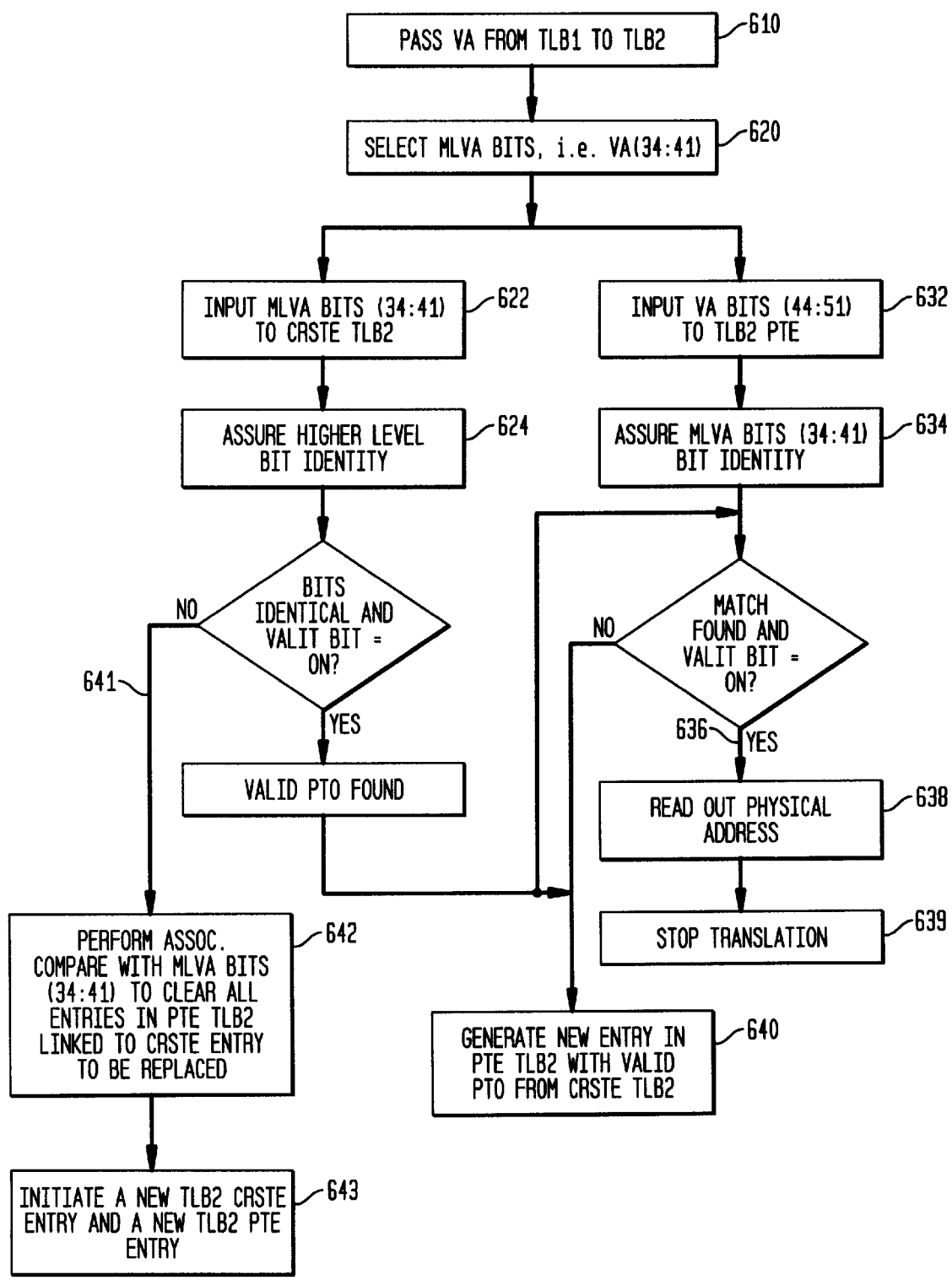

TRANSLATION LOOKASIDE BUFFER FOR VIRTUAL MEMORY SYSTEMS

BACKGROUND OF THE INVENTION

1. Technical Field

The present invention relates generally to hardware and system software of computer systems, and deals more particularly with a method and. system for improving the performance of translation lookaside buffers during address translation.

2. Prior Art

Virtual memory techniques including the provision of virtual code addresses are one of the basic concepts alleviating the job of application programmers in that they need not worry about the physical locations where code could be placed in memory when the program is loaded in order to be run.

A nearly unlimited virtual address space is provided thereby for the programmer's activities. In a process called 'address translation' such virtual addresses are transformed into physical addresses which uniquely define physical locations in the main memory at run-time.

In virtual memory, the address is broken into a virtual page number and a page offset. When translated into physical memory quantities the physical page number constitutes the upper portion of the page's physical address, while the page offset, which is not changed, constitutes the lower portion. The number of bits in the page offset field determines the page size. All the pages are managed in page tables.

Page tables are so large that they must be stored in main memory. This means that every memory access takes at least twice as long: one memory access to obtain the physical address and a second access to get the data. The key for improving access performance is to rely on locality of reference to the page table: When a translation for a virtual page number is used, it will probably be needed again in the near future of a program run, because the references to the words on that page have both temporal and spatial locality. Accordingly, modern machines include a special cache that keeps track of recently used translations. This special address translation cache is further referred to as a translation-lookaside buffer, or TLB.

Computer systems of the high end range like IBM ESA390 or ESAME system are equipped with an increasing amount of mainstorage in order to reduce the number of accesses to external storage devices.

The increasing mainstorage, however, necessitates larger TLBs, which hold the virtual to absolute translated addresses. A larger TLB, however, has a longer access time and this time adds to the instruction cache or data cache access time, respectively.

As a result, while a performance gain is seen having a larger mainstorage and caches, the performance might be degraded by the longer access time of the TLB.

For high end systems this problem could be solved by using a second level TLB in a similar way as a second level cache acts to support a first level cache. In such an arrangement the first level TLB further referred to herein as TLB1 would be kept small and would have a short access time while a second level TLB further referred to herein as TLB2 would be desired to have approximately 10 times more entries and would be arranged to feed the TLB1 if a required translation is available in the TLB2 but not in TLB1. If, however, a TLB2 would be structured like a TLB1, and assuming the TLB2 is 10 times larger, an array access could not be done within one cycle, thus any performance gain would be lost.

It is thus the object of the present invention to provide a TLB structure or TLB arrangement which is adapted to large address space, i.e. greater than or equal to 64 bit addresses and concurrently avoiding performance loss based on larger access time due to larger TLB structures forcedly implied by the more complex translation of larger addresses.

It is a further object of the present invention to keep in addition to the final translation also intermediate address translation values.

SUMMARY OF THE INVENTION

The basic idea comprised of the present invention is to provide a translation lookaside buffer (TLB) arrangement which advantageously uses two buffers, a small first level TLB1 and a larger second level TLB2. The second level TLB feeds address information to the first level TLB when the desired virtual address is not contained in the first level TLB. According to the invention the second level TLB is structured advantageously comprising two n-way set-associative sub-units of which one, a higher level unit covers some higher level address translation levels and the other one, a lower level unit, covers some lower level translation level. According to the present invention some address information holds some number of middle level virtual address (MLVA) bits, i.e. 8 bits, for example in case of 64 bit addresses, being able to serve as an index address covering the address range of the higher level sub-unit. Thus, the same information is used as a tag information in the lower-level sub-unit and is used herein as a quick reference in any look-up operation in order to find the absolute address of the concerned virtual address translation. Further, the commonly used status bits, like e.g. valid bits, are used in both TLB structures, too.

As an advantage the output of the higher-level sub-unit is a valid page table origin when a match is found for the higher address bits and a valid entry was built before. Thus the absolute physical address can be found very quickly. As in some processor architecture several translation table fetches are necessary, e.g. IBM mainframe ESAME requires five fetches to translate a 64-bit address and as the address change is in the lowest and last one used table, i.e., in the page table, the start address of it will be saved, i.e. the page table origin, further referred to herein as PTO and can be used again, if this page table is required. Thus, all accesses to the higher-level translation tables, as e.g. segment, region tables etc. are bypassed which is a considerable performance gain. With this feature the start address of the page table can be found within one cycle and can be used for the last table-access to get the absolute address.

As an additional advantageous feature of the present invention there can be advantageously provided a LRU-mechanism in the higher-level sub-unit in order to fill up the higher-level sub-unit compartments equally, This serves to increase the efficiency of the TLB arrangement.

A further advantage is the saving of chip area required to implement the aforementioned TLB arrangement: The PTE RAM contains only the absolute address and the valid bit, but the address tag data and the table root pointer are located in the CRSTE, thus are provided commonly for several PTE entries.

BRIEF DESCRIPTION OF THE DRAWINGS

Preferred embodiments of the present invention will now be described by way of example only, with reference to the accompanying drawings in which:

FIG. 6 is a flow chart showing the essential inventional features of the control flow during a TLB2 look-up.

DETAILED DESCRIPTION OF THE PREFERRED EMBODIMENTS OF THE INVENTION

Figure 1:
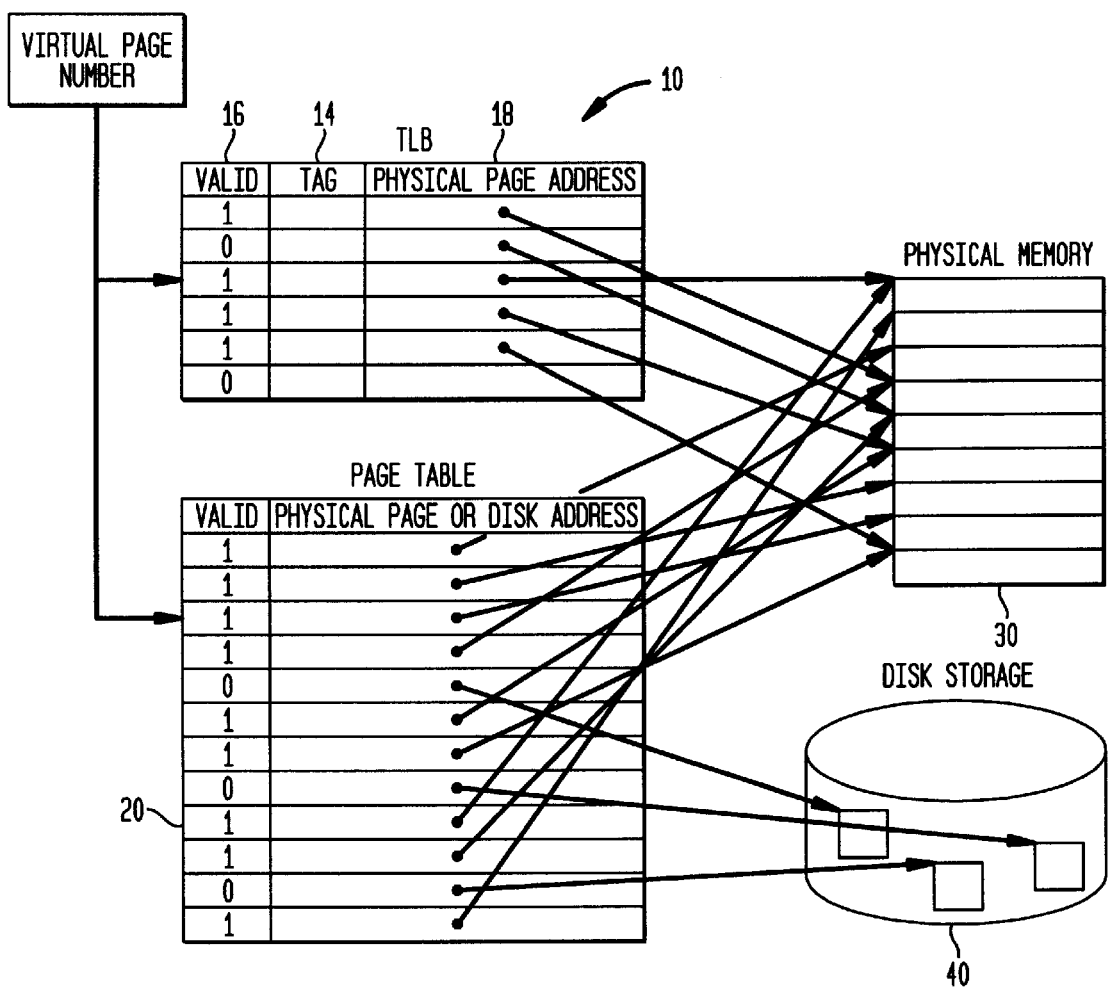
FIG. 1 is a schematic representation of prior art showing some principles of address translation management and the logical and physical units involved therein.

With general reference to the Figures and with special reference now to FIG. 1 a prior art translation lookaside buffer (TLB) 10, a page table 20, a physical memory 30 and a storage disk 40 is depicted. A virtual address is required to be translated into a physical address during program execution time. In the simple form depicted in the Figure said TLB 10 contains a subset of the virtual-to-physical address mappings that are processed by means of the page table 20. As the TLB 10 is a cache memory it has a tag field 14 comprising some of the high order bits of the virtual page addresses as a tag. A further status field 16 is provided in each TLB entry in order to indicate if the physical page address contained in field 18 is still valid or not, because, if a new entry is required then the older one must be invalidated. Caused by a change of a task, for example, all entries are purged correspondingly in order to free said TLB for reception of new address information belonging to the new task.

Generally, the TLB is a cache memory that holds only translation table mappings. Thus, each tag entry in the TLB holds a portion of the virtual page number, and each data entry of the TLB holds a physical page number. As it is not useful to access the page table on every reference, the TLB 10 is accessed as often as possible. Thus it needs to include other bits, such as the reference bit, a storage key, the change bit for controlling the write access, storage protection bit, etc.

If there is no matching entry in the TLB 10 for a page the page table 20 must be examined. The page table 20 either supplies a physical page number for the page which can then be used for building a TLB entry or it indicates that the page resides on disk 40, in which a page fault would occur.

On every reference, the virtual page number in the TLB is looked up. If there is a hit, the physical page number is used to form the address, and the corresponding reference bit is turned on. If the processor is performing a write, the change bit is also turned on. If a miss in the TLB occurs, it must be determined whether it is a page fault or merely a TLB miss. Because the TLB has many fewer entries than the number of pages in physical memory, TLB misses will be much more frequent than true page faults. On a TLB miss, if the page exists in memory, the translation can be loaded from the page table into the TLB and the reference can be tried again. If the page is not present in memory, a page fault has occurred and the operating system must be notified with an exception.

Figure 2:
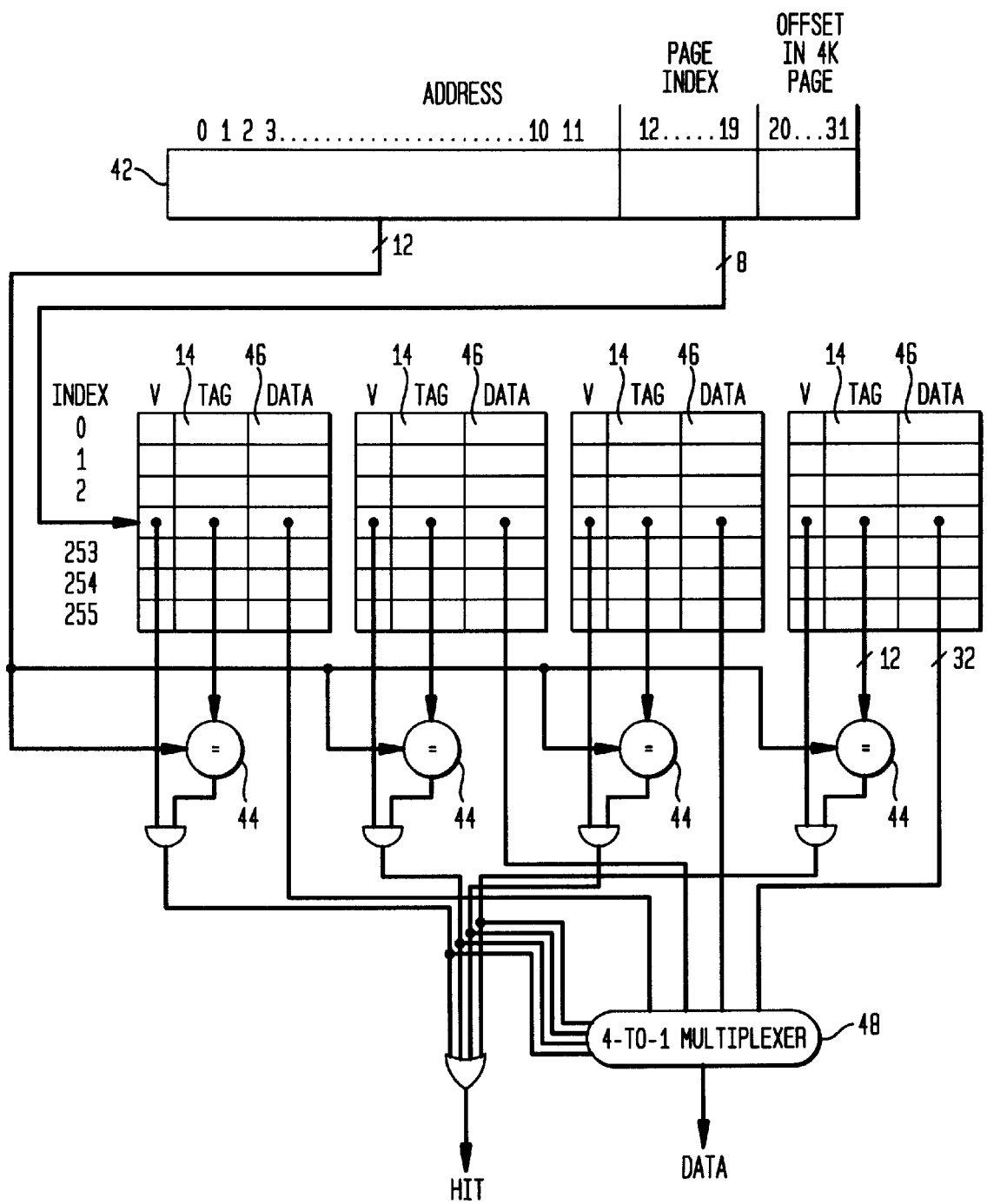
FIG. 2 is a schematic representation of a prior art implementation of a 4-way set-associative cache used as a TLB in address translation.

With reference now to FIG. 2 a prior art implementation of a 4-way set-associative cache used as a TLB in address translation is described in more detail in order to introduce to TLB architecture details needed to understand concepts of the present invention.

A 32 bit virtual address 42 abbreviated further as VA is object of the address translation. Bits 12 to 19 of it are used as an index in order to address a specific row in each of the 4 sets of the TLB. Bits 0 to 11 are compared in comparators 44 with the tag field 14 of the associated row.

The comparators 44 determine which element of the selected set (if any) matches the tag. The output of the comparators is used to select the data 46 from one of the four indexed sets, using a multiplexor 48.

Figure 3:
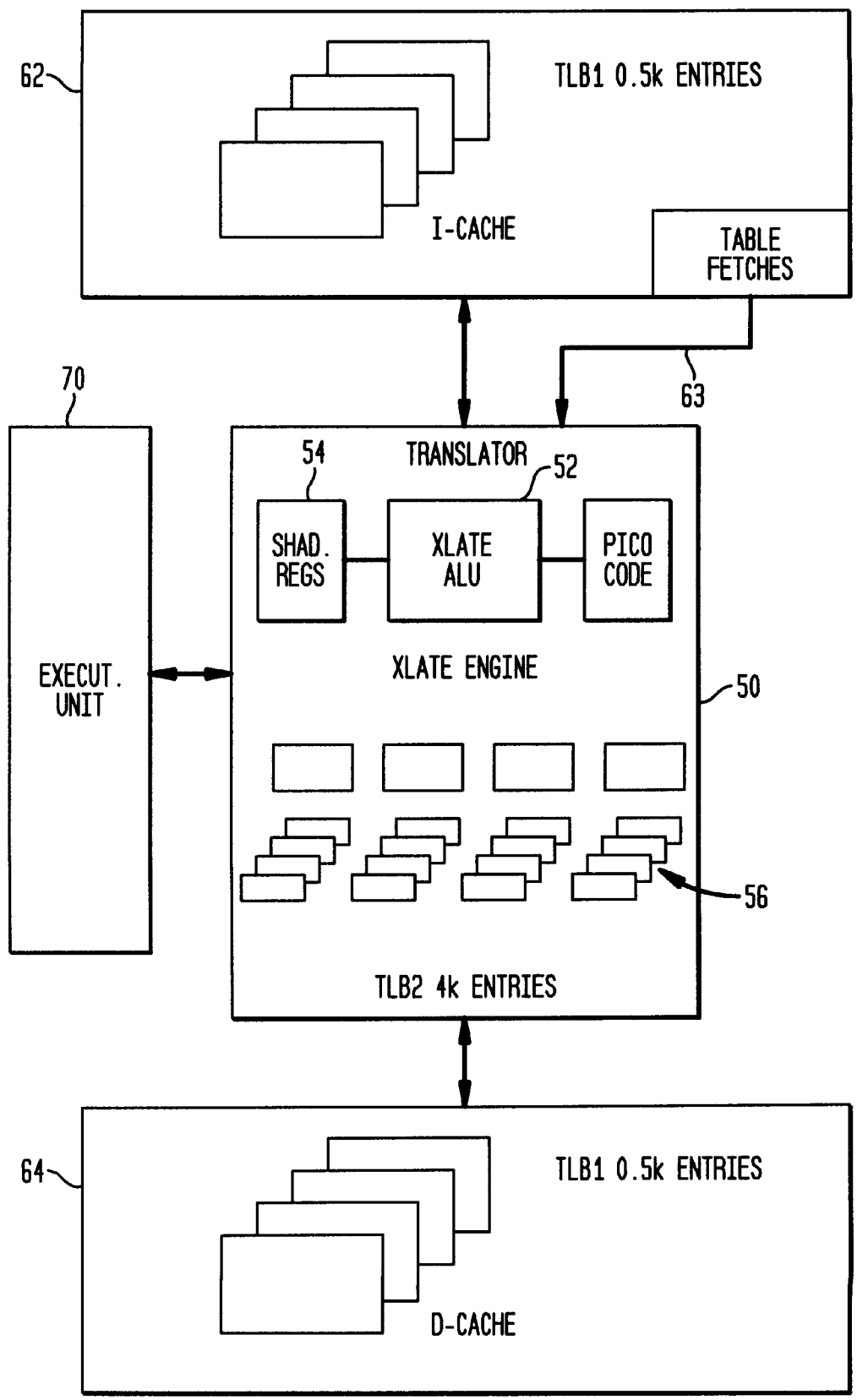
FIG. 3 is a schematic block diagram showing the basic data flow involved in address translation according to the invention.

With reference now to FIG. 3 the basic data flow involved in address translation according to the invention is described in more detail.

The inventional address translation management unit (MMU) referenced as a whole with reference sign 50 in the center of the architectural block diagram comprises at least an address translation ALU 52 and a set of shadow registers 54 and a second level translation lookaside buffer 56. Said address translation managing unit 50 works together with a first level instruction cache 62 (TLB1) as well as with a first level data cache 64 (TLB1). Said instruction cache 62 prompts the address translator 50 for a required address translation. The table fetches in this context are shown separately by an arrow 63 indicating the fetch operation. Said MMU 50 is left-side connected to an execution unit 70 for providing it with the required translation parameters, such as 32 or 64 bit addresses and for receiving the exception information in case the table entry is invalid, for example.

Address data are delivered to both first level caches 62, 64 when there is a respective missing. physical address. In the example architecture depicted in FIG. 3 both first level caches 62, 64 are designed to have 512 entries. So, both first level caches are kept small providing a short access time to the most frequently used address data.

Said second level translation lookaside buffer (TLB2) 56 is depicted according to a preferred embodiment of the invention to be a 4-way-set-associative cache having 1024, i.e. 1 k entries in each of the 4 sets giving a maximum of 4 k entries, referring to address translation management of 64 bit addresses.

In case a valid TLB1 entry is not available in the instruction cache 62 or in the data cache 64, respectively, the corresponding virtual address is sent together with the table origin of the highest translation table to the address translator 50. Said translator immediately starts the translation process and in parallel it looks up the TLB2 56 for the required physical address.

In case of a TLB2 hit the physical address is sent to the instruction cache 62 or data cache 64, respectively, and the translation stops. In case of a miss, address translation continues until the right physical address is found and the translator stops operation, as will be described with reference to FIG. 6.

At the end of the translation process, the result data is stored in the requesting TLB1 and in TLB2.

Figure 4:
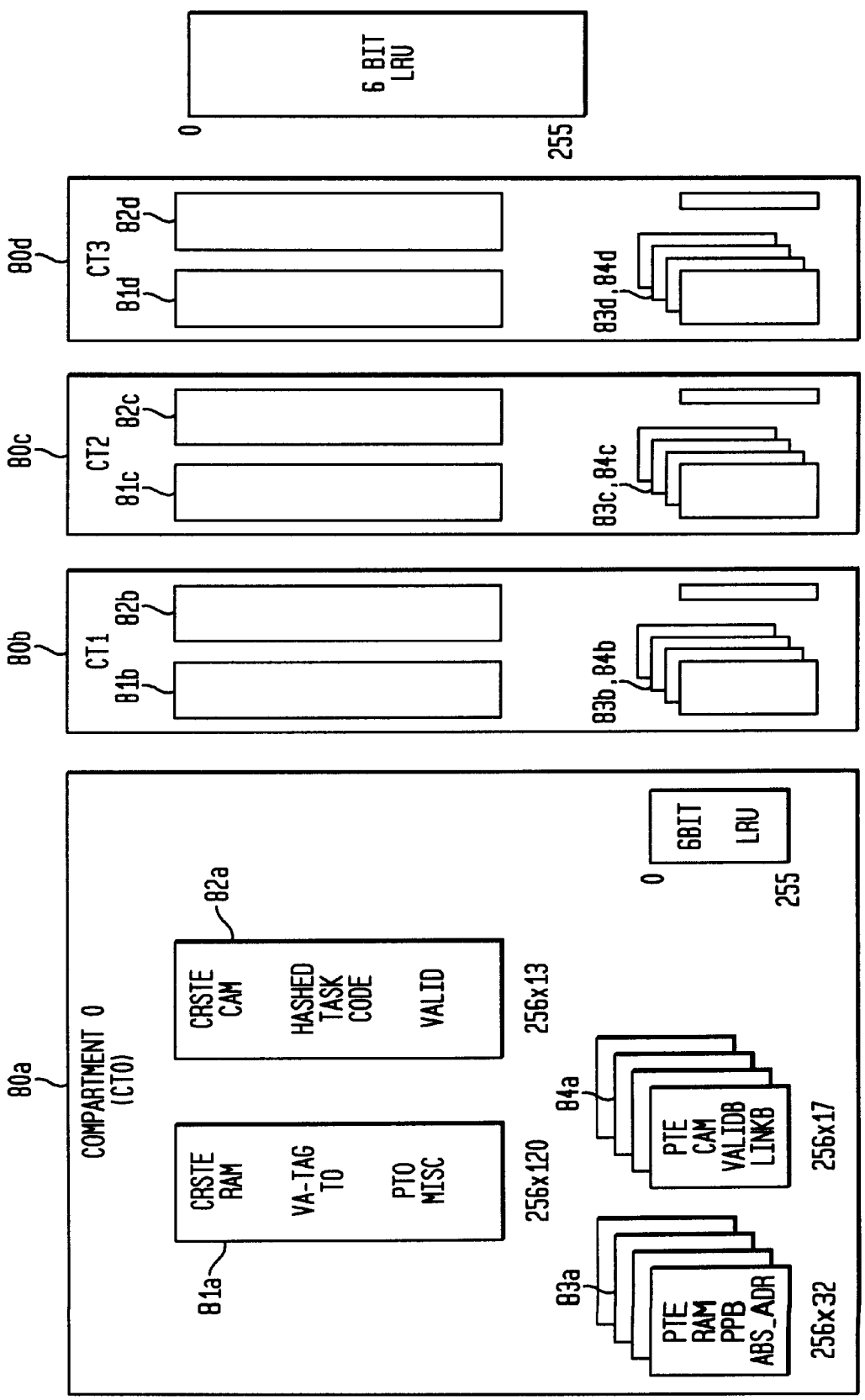
FIG. 4 is a schematic block diagram showing the basic structure of the second level TLB used in the TLB arrangement according to the invention.

With reference now to FIG. 4 the basic structure of the second level TLB2 used in the TLB arrangement according to the invention is described in more detail and in an embodiment of the present invention adapted to IBM ESAME architecture. This architecture uses TLB combined region-and-segment-table entries (CRSTE) connected to TLB page-table entries (PTE), where first regions, then segments and thereafter pages is the order in which address translation takes place.

A preferred organization is 4- or 8-way set associative. 30 In the example in the FIG. 4 the 4-way organization is depicted.

Each of the four rows comprises a so-called CRSTE 'compartment' 80, i.e., 80a–80d, each having a RAM portion 81a to 81d and a CAM portion 82a to 82d with each 256 entries and a PTE TLB2 memory arrangement comprising as well a RAM portion 83a to 83d and a CAM portion 84a to 84d.

In each compartment 80 the CRSTE TLB2 is linked to said PTE TLB2, having a similar 4-way-set-associative organization as the CRSTE TLB2 for a total of 1024 entries. (4×256=1024 PTE entries).

Both, CRSTE TLB2 and PTE TLB2 consist of a RAM portion and a CAM portion.

The logical contents of the CRSTE TLB2 RAM entries are: Table origin (TO) of the highest translation table, i.e., the root pointer, page table origin (PTO), and the address tag data VA. Some miscellaneous bits common for all pages, such as protected segments bits can also be provided here.

The CRSTE CAM, i.e., content addressable memory contains at least the entry valid bit together with some hashed task code which may be used to clear all entries of a task; if not needed anymore, i.e., if the data in the CAM match with externally supplied data the associated valid bit of the entry is reset. Of course, further entries can be provided depending on requirements of the respective MMU architecture.

The logical contents of the PTE TLB2 RAM are as follows: The absolute address (ABS_ADR), i.e., the physical address corresponding to the virtual one and a page protection bit.

The logical contents of the PTE CAM are as follows:

An entry valid bit (VALIDB), and link tag data (LINKB) to CRSTE. This function is needed to invalidate all PTE entries linked to a specific CRSTE entry if the CRSTE entry is replaced.

Optionally, a storage key can be a part of each PTE TLB2 entry, too, although this is not depicted.

Generally, whenever an entry is made into the CRSTE/PTE structure, the 8 virtual address bits VA (34:41) referred to in FIG. 4 as link bits (LINKB) and used to address the CRSTE row, are stored in the PTE TLB2 itself. Now each entry in TLB2 PTE is assigned to a unique CRSTE row, namely, the one which was used to build the entry in PTE TLB2. Basically, one and the same VA(34:41) number can be everywhere in the PTE TLB2.

Whenever a CRSTE entry must be replaced which depends on the LRU value, then all PTE values having the same VA(34:41) must be invalidated, which is usually done with a content-addressable memory (CAM) search operation.

Figure 5:
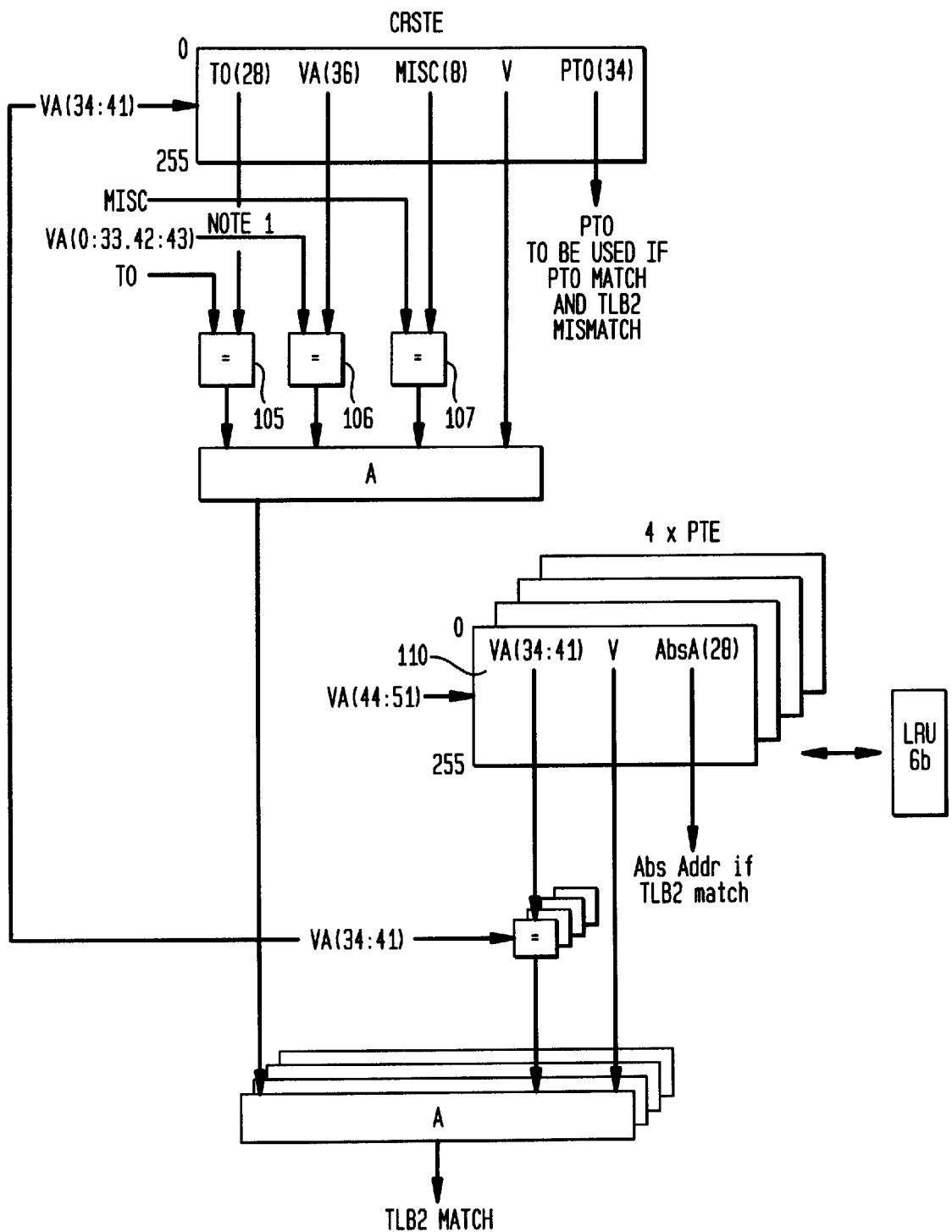
FIG. 5 shows a schematic block diagram of one compartment depicted in FIG. 4 describing the control flow of the basic logic operations. needed in a TLB2 lookup operation.

The initial fill up sequence should be performed in a preferred manner, e.g., such that new entries are spread over different CRSTE rows in a balanced way. Consecutive addresses should 'cross' the CRSTE TLB2 horizontal and PTE TLB2 vertically. This behavior is accomplished by reversing some address bits of CRSTE. In particular, according to a preferred embodiment as depicted in FIG. 5, the LRU mechanism takes two bits, i.e., VA(42:43) of the virtual address in order to associate the storage location of one of the four particular compartments with a specific bit sequence. Thus, compartment 0 can be filled up with virtual addresses having VA(42:43) bits like 0 0, compartment 1 having those bits like 0 1, etc.

With common reference now to FIG. 5 and FIG. 6 a schematic block diagram of one compartment depicted in FIG. 4 is given for describing the control flow of the basic logic operations needed in a TLB2 lookup operation.

In case of a TLB2 look-up the virtual address to be looked up is passed together with the table root pointer from TLB1 to TLB2—step 610. In particular some bits of it, referred to above as MLVA bits and depicted here as bits VA(34:41) which are empirically known to offer the best efficiency of the inventional TLB arrangement are selected—step 620 and are input—step 622—into CRSTE TLB2 in order to assure—step 624—the identity with the higher-level bits of the virtual address, depicted here as TO (28), VA (36) and MISC(8), which is done in comparators 105, 106, 107 and, VA (44:51) used for addressing the page tables are input— step 632—into PTE TLB2. where they are compared in parallel—step 634—with all VA (34:41) read out of the PTE TLB2 address by the address portion VA (44:51).

If a match is found in TLB2 PTE and CRSTE and assuming both valid bits in CRSTE and PTE are on—branch 636—, then a valid absolute address 110 can be read out from PTE TLB2—step 638 and the translation stops—step 639.

If no match is found in TLB2 PTE or PTE data is invalid two cases are to be distinguished:

First:, when the CRSTE look up matches the input virutal address and the entry is valid, then the PTO from CRSTE TLB2 can be used to form a respective new entry with the PTO from CRSTE—step 640.

Or, when the CRSTE shows no match to the input virtual address—branch 641—a complete new entry in both, TLB2 CRSTE and TLB2 PTE has to be performed—step 643. Before writing a new entry into CRSTE all PTE entries linked to the old entry must be invalidated. This is done using the PTE CAM functionality—step 642.

According to the invention both operation sequences depicted in the left side and the right side branch of FIG. 6 can be performed independently from and in parallel to each other which represents a performance advantage.

An enormous advantage is achieved if a CRSTE hit is found and PTE miss occurs concurrently. In this case the PTO of the CRSTE can be used to perform the last translation step thus bypassing all higher level translation steps.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

In particular, an advantage can be seen when the inventional concept is extended to more than two independent operation sequences, e.g., when more tables are used for address translation. Then the intermediate results derived from more than one higher-level sub-unit as it is the PTOs in the above example can be advantageously re-used without to repeat the work necessary to verify the higher-level address ranges every time again.

A further advantage is the saving of chip area required to implement the aforementioned TLB arrangement: the PTE RAM contains only the absolute address and the valid bit, but the address tag data and the table root pointer are located in th CRSTE, thus are provided commonly for several PTE entries.

The same arguments apply also for the higher level address identification logic.

A further advantage is the smaller array size where the address identification logic is stored as compared to prior art TLB structure which would have 4 arrays each of them having 1 k entries. The access of the address identification data in the RAM would last much longer.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A translation lookaside buffer (TLB) arrangement for use in fast address translation comprising a translation lookaside buffer arranged as a n-way-set associative buffer having n compartments, said buffer arrangement comprising at least two linked hierarchical sub-units, a first sub-unit comprising a lookaside buffer for some higher level address translation levels, and the second sub-unit comprising a lookaside buffer for some lower level address translation levels, and said second sub-unit being arranged to store TLB index address information of the upper level unit as tag information in it's lower level TLB structure.

2. The arrangement according to claim 1, comprising at least two translation lookaside buffers of which a first one (TLB1) is a first level buffer and a second one (TLB2) is a second level translation lookaside buffer arranged to feed said first one with address information in case of a missing address of the first one, said second TLB2 being arranged as having said at least two linked hierarchical sub-units.

3. The arrangement according to claim 2, comprising content addressable memory (CAM).

4. The arrangement according to claim 3, wherein LRU-information is provided in both sub-units.

5. The arrangement according to claim 4, wherein at least said lower-level sub-unit comprises a content addressable memory (CAM).

6. The arrangement according to claim 5, comprising a storage location in the higher-level sub-unit for storage of the page table origins of page tables used in the lower-level sub-unit.

7. A method for operating a translation lookaside buffer arrangement according to claim 1, comprising holding all data provided from higher level address translation tables and relevant for verification of a virtual address in at least said first sub-unit, said data being additionally relevant for verification of said virtual address in a respective second sub-unit if some link data provided in said second sub-unit for linking to said at least said first sub-unit matches a predefined portion (MLVA-bits) of the virtual address to be translated.

8. The method according to claim 7, comprising the step of performing a virtual address look-up procedure split up into at least two sub-operations each being performed in parallel in a second sub-unit and in a first sub-unit, in which look-up procedure at least one first sub-operation performs a look-up of the most significant address bit group of the input virtual address by means of said first sub-unit, and a second suboperation, performs a verification of the lower-level address bits of the input virtual address with address data stored in a respective second sub-unit.

* * * * *